(12) United States Patent
Garthaffner et al.

(10) Patent No.: US 10,278,424 B2
(45) Date of Patent: May 7, 2019

(54) ELECTRONIC VAPING DEVICE

(71) Applicant: Altria Client Services LLC, Richmond, VA (US)

(72) Inventors: Travis M. Garthaffner, Midlothian, VA (US); Peter Lipowicz, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 194 days.

(21) Appl. No.: 15/216,069

(22) Filed: Jul. 21, 2016

(65) Prior Publication Data

US 2018/0020721 A1    Jan. 25, 2018

(51) Int. Cl.

| A61H 33/12 | (2006.01) |
| A61L 9/03 | (2006.01) |
| A24F 47/00 | (2006.01) |
| F22B 1/28 | (2006.01) |
| H02J 7/00 | (2006.01) |
| H05B 1/02 | (2006.01) |
| H05B 3/44 | (2006.01) |

(52) U.S. Cl.
CPC ............ *A24F 47/008* (2013.01); *F22B 1/284* (2013.01); *H02J 7/0047* (2013.01); *H02J 7/0052* (2013.01); *H05B 1/0297* (2013.01); *H05B 3/44* (2013.01); *H02J 2007/0062* (2013.01)

(58) Field of Classification Search
CPC ............ A24F 47/008; H02J 2007/0062; H02J 7/0047; H02J 7/0052; H05B 1/0297; H05B 3/44; F22B 1/284

USPC .................................................. 392/386–406
See application file for complete search history.

(56) References Cited

U.S. PATENT DOCUMENTS

| 5,249,586 A | 10/1993 | Morgan et al. |
| 5,505,214 A | 4/1996 | Collins et al. |
| 5,865,185 A | 2/1999 | Collins et al. |
| 8,156,944 B2 | 4/2012 | Han |
| 8,499,766 B1 | 8/2013 | Newton |
| 8,899,238 B2 | 12/2014 | Robinson et al. |
| 9,078,473 B2 | 7/2015 | Worm et al. |
| 2011/0094523 A1* | 4/2011 | Thorens ............... A24F 47/008 131/194 |
| 2013/0192623 A1 | 8/2013 | Tucker et al. |
| 2013/0298905 A1 | 11/2013 | Levin et al. |

(Continued)

FOREIGN PATENT DOCUMENTS

| CA | 2843247 A1 | 6/2013 |
| KR | 10-1011453 | * 1/2011 |

(Continued)

OTHER PUBLICATIONS

English translation of KR101011453 which is an equivalent document of WO2012/043941, 2012.*

(Continued)

*Primary Examiner* — Sang Y Paik
(74) *Attorney, Agent, or Firm* — Harness, Dickey & Pierce, P.L.C.

(57) ABSTRACT

A cartridge of an electronic vaping device includes a housing assembly and a reservoir cap assembly. The housing assembly is a single piece housing assembly. The reservoir cap assembly includes a reservoir cap having a hole there through and at least one wick extending through an opening in the reservoir cap.

27 Claims, 9 Drawing Sheets

(56) References Cited

U.S. PATENT DOCUMENTS

| | | |
|---|---|---|
| 2014/0109921 A1 | 4/2014 | Chen |
| 2014/0150785 A1 | 6/2014 | Malik et al. |
| 2014/0182610 A1 | 7/2014 | Liu |
| 2015/0040929 A1* | 2/2015 | Hon ............... A24F 47/008 |
| | | 131/329 |
| 2015/0117842 A1 | 4/2015 | Brammer et al. |
| 2015/0136124 A1 | 5/2015 | Aronie et al. |
| 2016/0050976 A1 | 2/2016 | Righetti et al. |

FOREIGN PATENT DOCUMENTS

| | | |
|---|---|---|
| WO | WO-2010118644 A1 | 10/2010 |
| WO | WO-2012/043941 A1 | 4/2012 |
| WO | WO-2014194972 A1 | 12/2014 |
| WO | WO-2015082652 A1 | 6/2015 |
| WO | WO-2015131991 A1 | 9/2015 |

OTHER PUBLICATIONS

International Search Report and Written Opinion for International Application No. PCT/EP2017/068532 dated Oct. 11, 2017.

* cited by examiner

ELECTRONIC VAPING DEVICE

BACKGROUND

Field

The present disclosure relates to an electronic vaping or e-vaping device configured to deliver a pre-vapor formulation to a vaporizer.

Description of Related Art

An electronic vaping device includes a heater element, which vaporizes a pre-vapor formulation to produce a vapor. The pre-vapor formulation may include vapor formers, water, and/or flavors.

SUMMARY

At least one example embodiment relates to a cartridge of an electronic vaping device.

In at least one example embodiment, a cartridge of an electronic vaping device includes a housing assembly. The housing assembly is a single piece housing assembly that includes a housing extending in a longitudinal direction. The housing is generally cylindrical. The housing includes an outer surface, an inner surface, and a reservoir therein. The reservoir is configured to contain a pre-vapor formulation. In at least one example embodiment, the housing assembly also includes a transverse end wall at a first end of the housing. The transverse end wall includes at least one outlet extending therethrough. The transverse wall is integrally formed with the housing. In at least one example embodiment, the housing assembly also includes an opening in a second end of the housing, a secondary transverse wall, and at least one air passage extending longitudinally through the housing between the outer surface and the inner surface of the housing. The secondary transverse wall is between the opening and the transverse end wall. The secondary transverse wall and the inner surface define the reservoir. The at least one air passage has at least one air passage outlet between the transverse end wall and the secondary transverse wall such that the at least one air passage outlet communicates with the at least one outlet.

In at least one example embodiment, the cartridge also includes a reservoir cap assembly configured to be inserted in the opening. The reservoir cap assembly includes at least one wick extending through an opening in the reservoir cap.

In at least one example embodiment, the wick is a monolithic wick. The monolithic wick may include at least one slot extending longitudinally through the wick. The wick may include at least two slots. The slots may have same or different dimensions. The slots may be uniformly or non-uniformly spaced in the wick. The wick may have a height of about 3 mm to about 20 mm, a width of about 0.5 mm to about 3 mm, and a length of about 0.5 mm to about 3 mm. The wick may have a generally square cross-section.

In another example embodiment, the wick comprises a plurality of filaments. The filaments may extend in the longitudinal direction.

In at least one example embodiment, the wick is formed from one or more of cellulose, glass, ceramic and graphite.

In at least one example embodiment, the wick has a first end extending into the reservoir and a second end extending from the opening in the reservoir cap.

In at least one example embodiment, the reservoir is configured to contain about 400 microliters to about 1000 microliters of the pre-vapor formulation.

In at least one example embodiment, the cartridge includes eight air passages spaced substantially uniformly around the housing. Each of the air passages extends longitudinally between the outer surface and the inner surface of the housing.

At least one example embodiment relates to an electronic vaping device.

In at least one example embodiment, an electronic vaping device includes a cartridge and a power supply section.

In at least one example embodiment, a cartridge of an electronic vaping device includes a housing assembly. The housing assembly is a single piece housing assembly that includes a housing extending in a longitudinal direction. The housing is generally cylindrical. The housing includes an outer surface, an inner surface, and a reservoir therein. The reservoir is configured to contain a pre-vapor formulation. In at least one example embodiment, the housing assembly also includes a transverse end wall at a first end of the housing. The transverse end wall includes at least one outlet extending there through. The transverse wall is integrally formed with the housing. In at least one example embodiment, the housing assembly also includes an opening in a second end of the housing, a secondary transverse wall, and at least one air passage extending longitudinally through the housing between the outer surface and the inner surface of the housing. The secondary transverse wall is between the opening and the transverse end wall. The secondary transverse wall and the inner surface define the reservoir. The at least one air passage has at least one air passage outlet between the transverse end wall and the secondary transverse wall such that the at least one air passage outlet communicates with the at least one outlet.

In at least one example embodiment, the cartridge also includes a reservoir cap assembly configured to be inserted in the opening. The reservoir cap assembly includes at least one wick extending through an opening in the reservoir cap.

In at least one example embodiment, the power supply section includes a heating element and a battery electrically connected to the heating element.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
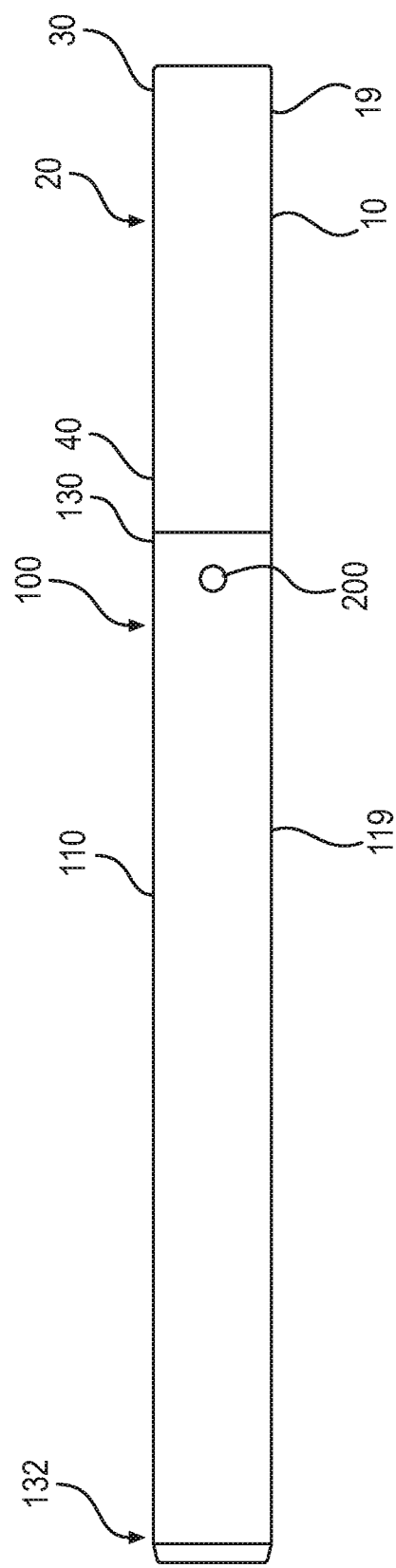
FIG. 1 is a side view of an electronic vaping device according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a side view of an electronic vaping device according to at least one example embodiment.

In at least one example embodiment, as shown in FIG. 1, an electronic vaping device 100 may include a cartridge 10 and a power supply section 110. The power supply section 110 has a first end 130 and a second end 132. The cartridge has a first cartridge end 30 and a second cartridge end 40.

In at least one example embodiment, the cartridge 10 includes a housing assembly 20 including a housing 19.

In at least one example embodiment, the power supply section 110 may include a housing 119 extending in the longitudinal direction. The housing 119 may have at least one air inlet 200 extending through the housing 119.

In at least one example embodiment, the housings 19, 119 may be formed of plastic or metal and may have a generally circular cross-section. The housings 19, 119 may have a square or triangular cross-section. Dimensions of the housings 19, 119 may be uniform along a length thereof or may be the same.

In at least one example embodiment, an outer diameter of the housing 119 may be the same as the outer diameter of the housing 19, such that a diameter of the electronic vaping device 100 is uniform along a length thereof.

In at least one example embodiment, the second cartridge end 40 is sized and configured to be received within the first end 130 of the power supply section 110. The second end 40 may friction fit within the housing 119 of the power supply section 110.

In at least one example embodiment, the housing 119 of the power supply section 110 includes at least one air inlet 200 formed therein. The air inlet 200 may be sized and configured to establish a desired resistance-to-draw (RTD). The air inlet 200 may be positioned so that air passing into the electronic vaping device 100 through the air inlet 200 passes into the air passages 35 established in the cartridge 10.

In at least one example embodiment, the cartridge 10 may be replaced once the pre-vapor formulation is depleted and the power supply section 110 may be reused.

Figure 2:
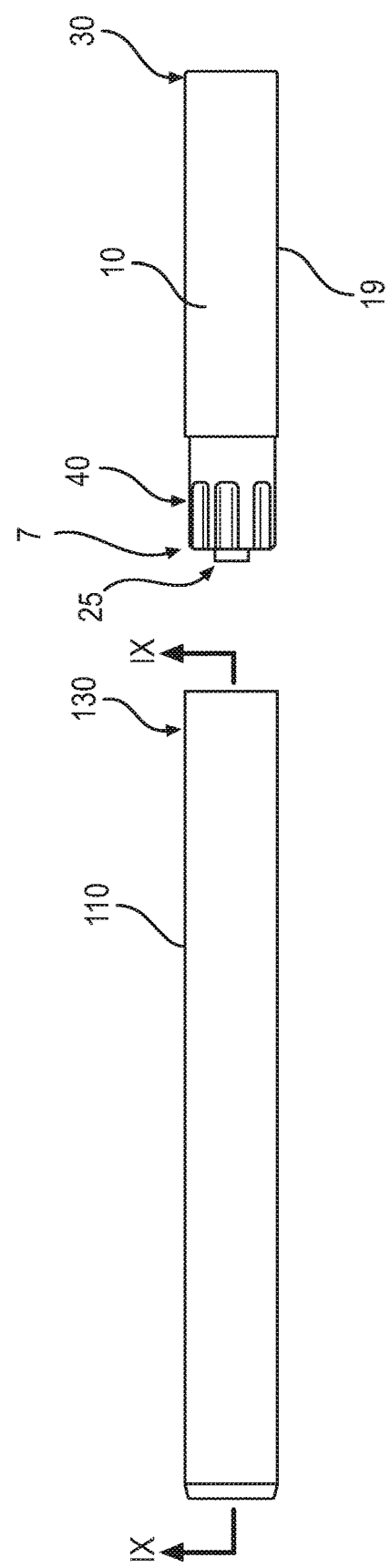
FIG. 2 is an exploded side view of a cartridge and a power supply section of the electronic vaping device of FIG. 1 according to at least one example embodiment.

FIG. 2 is an exploded side view of a cartridge and a power supply section of the electronic vaping device of FIG. 1 according to at least one example embodiment.

In at least one example embodiment, as shown in FIG. 2, the electronic vaping device 100 is the same as in FIG. 1, but is shown with the cartridge 10 detached from the power supply section 110. The cartridge may include a wick 25 at a second end 7 of the housing 19. The housing 19, at the second end 7, may be sized and configured to be received in the first end 130 of the power supply section 110.

Figure 3:
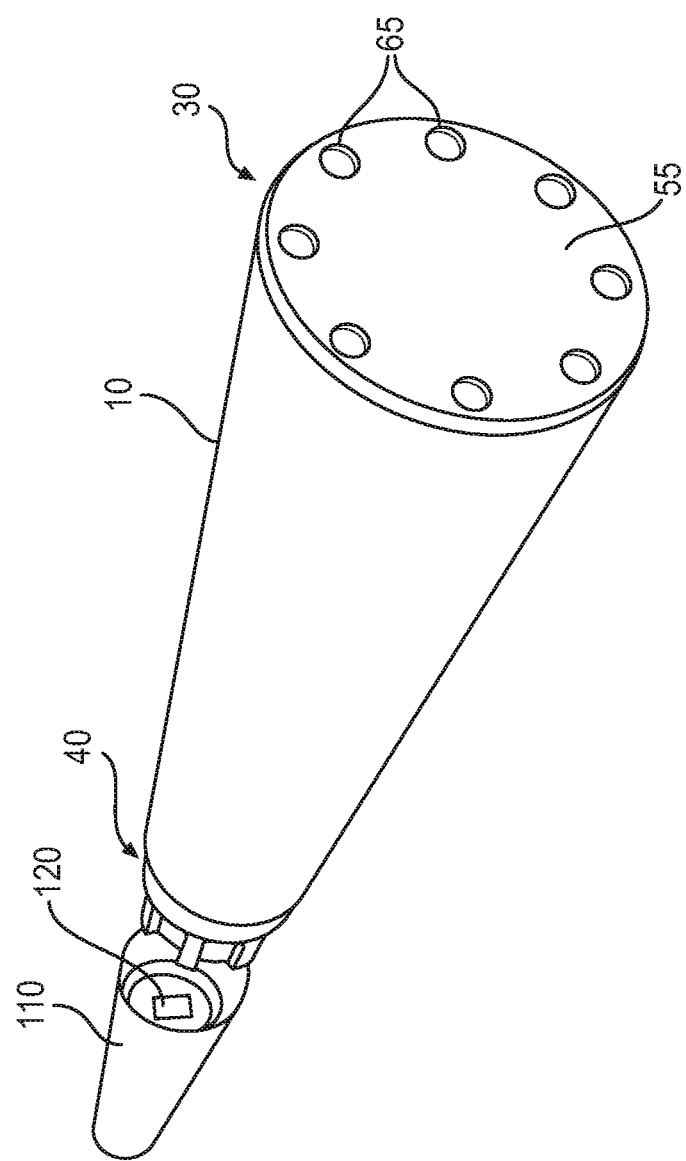
FIG. 3 is an exploded perspective view of the electronic vaping device of FIG. 1 according to at least one example embodiment.

FIG. 3 is an exploded perspective view of the electronic vaping device of FIG. 1 according to at least one example embodiment.

In at least one example embodiment, as shown in FIG. 3, the electronic vaping device 100 is the same as in FIGS. 1 and 2, but a heater 120 is shown in the power supply section 110, and a transverse end wall 55 with outlets 65 is shown at the first cartridge end 30 of the cartridge 10. Air and/or vapor may flow through the at least one outlet 65 when exiting the cartridge 10.

Figure 4:
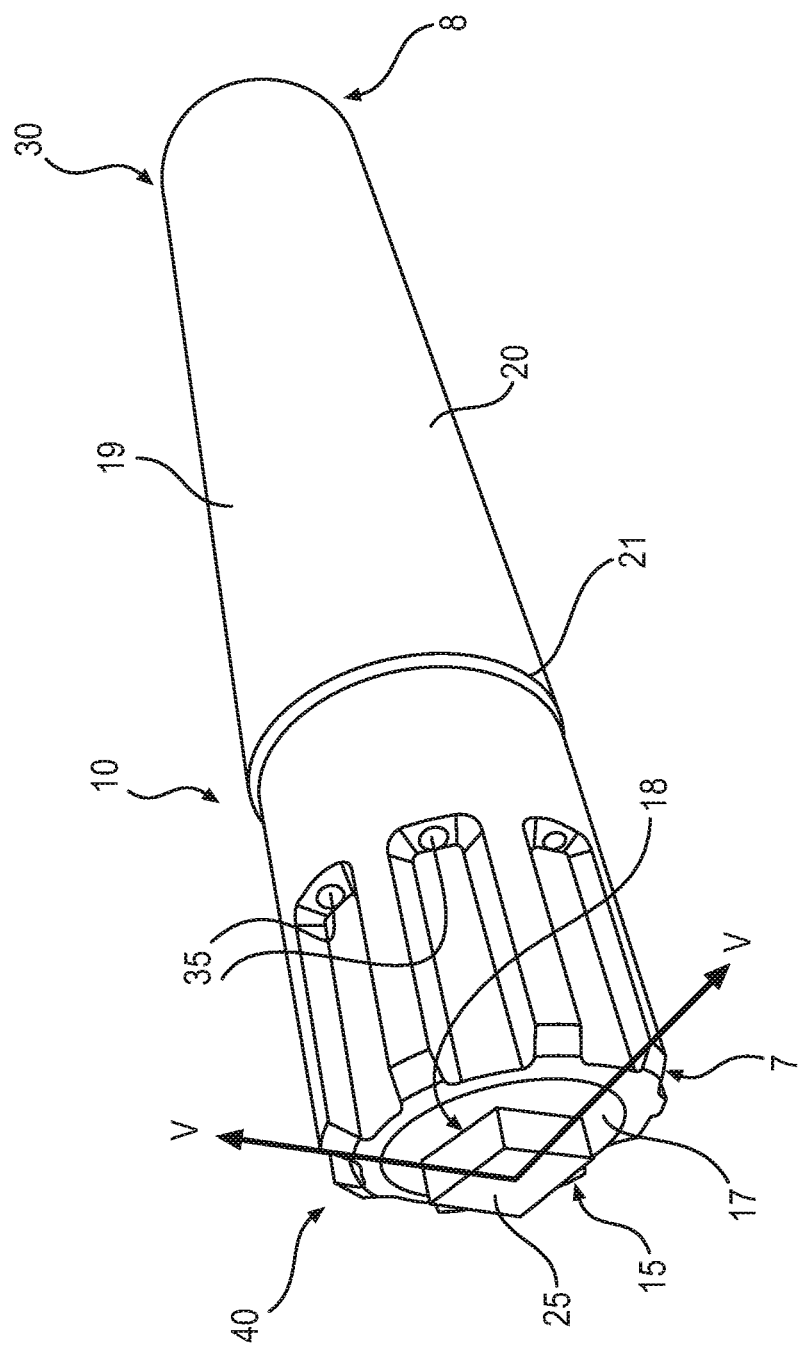
FIG. 4 is a perspective view of a cartridge of an electronic vaping device according to at least one example embodiment.

FIG. 4 is a perspective view of a cartridge of an electronic vaping device according to at least one example embodiment.

In at least one example embodiment, as shown in FIG. 4, the cartridge 10 is the same as in FIGS. 1, 2, and 3, but in greater detail. As shown in FIG. 4, the cartridge 10 includes a reservoir cap assembly 15 and a housing assembly 20.

In at least one example embodiment, the housing assembly 20 is a single piece that is integrally formed. The housing assembly 20 may be 3D printed or injection molded.

In at least one example embodiment, the housing assembly 20 includes the housing 19 extending in a longitudinal direction. The housing 19 may be about 10 mm to about 50 mm in length (e.g., about 15 mm to about 45 mm, about 20 mm to about 40 mm, or about 35 mm to about 35 mm). In at least one example embodiment, the housing 19 may have a diameter ranging from about 5 mm to about 10 mm (e.g., about 7 mm to about 8 mm). The diameter of the housing 19 may be larger at a first end 8 than at a second end 7.

In at least one example embodiment, the housing 19 may be generally cylindrical in cross-section. In at least one example embodiment, the housing 19 may have a generally triangular cross-section.

In at least one example embodiment, the housing 19 may be formed of plastic or metal. The plastic or metal may be heat resistant. In at least one example embodiment, suitable plastics include high density polyethylene (HDPE), nylon, and polyamide. The plastic may be biodegradable. The plastic may be coated with a chemically inert material so as to prevent reactions with the pre-vapor formulation and/or degradation of the plastic.

In at least one example embodiment, as shown in FIG. 4, the reservoir cap assembly 15 may include a reservoir cap 17 having an opening 18 therein and the wick 25 extending through the opening 18.

In at least one example embodiment, the wick 25 may be a monolithic wick. In some example embodiments, the wick 25 may include a plurality of filaments.

In at least one example embodiment, the wick 25 is formed from one or more of cellulose, glass, ceramic and graphite. For example, the wick may be formed of alumina and/or zirconia.

Figure 5:
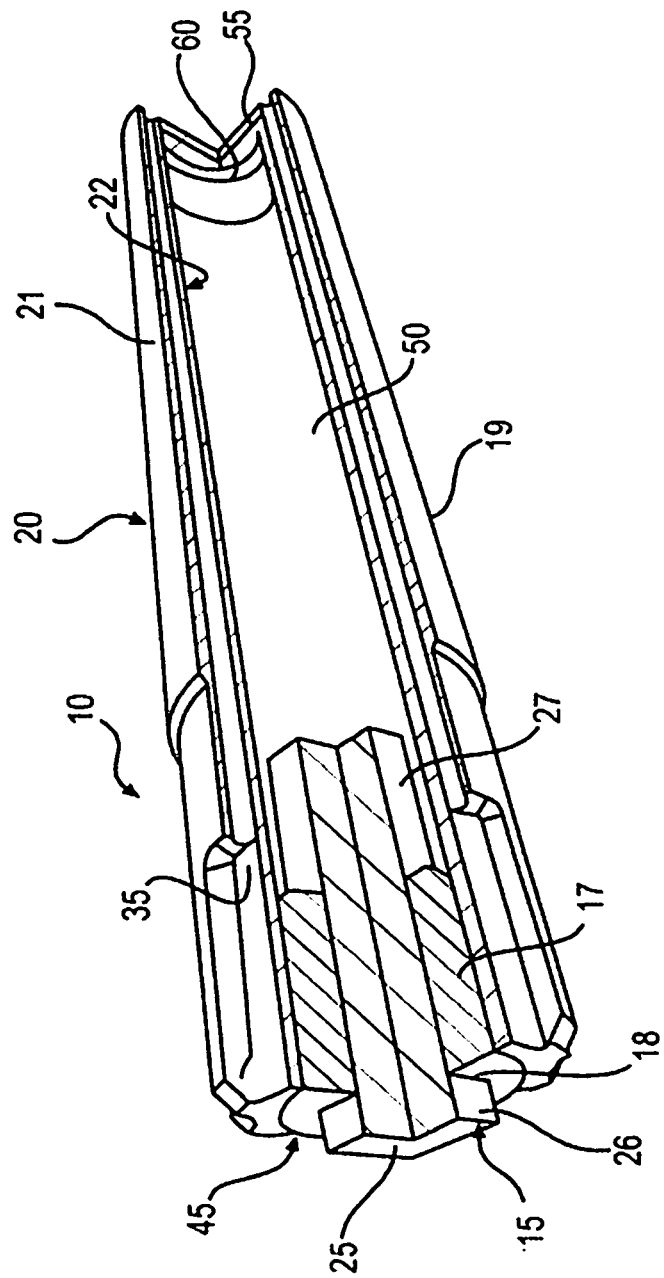
FIG. 5 is a cut-out view of the cartridge of FIG. 4 along line V-V according to at least one example embodiment.

FIG. 5 is a cut-out view of the cartridge of FIG. 4 along line V-V according to at least one example embodiment.

In at least one example embodiment, as shown in FIG. 5, the cartridge 10 is the same as in FIGS. 1-4, but is shown with a reservoir 50 within the cartridge 10. In at least one example embodiment, the housing 19 includes an outer surface 21 and an inner surface 22. A reservoir 50 is defined between opposing portions of the inner surfaces 22 of the housing 19 and the reservoir cap assembly 15.

In at least one example embodiment, the reservoir 50 is sized and configured to contain a pre-vapor formulation.

In at least one example embodiment, the reservoir 50 is configured to contain about 400 microliters to about 1000 microliters (e.g., about 500 microliters to about 900 microliters or about 600 microliters to about 800 microliters) of the pre-vapor formulation.

In at least one example embodiment, the pre-vapor formulation is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol. The pre-vapor formulation may include those described in U.S. Patent Application Publication No. 2015/0020823 to Lipowicz et al. filed Jul. 16, 2014 and U.S. Patent Application Publication No. 2015/0313275 to Anderson et al. filed Jan. 21, 2015, the entire content of each of which is incorporated herein by reference thereto.

In at least one example embodiment, the cartridge 10 may be replaceable. In other words, once the pre-vapor formulation of the cartridge 10 is depleted, the cartridge 10 may be discarded and replaced with a new cartridge. In another example embodiment, the reservoir 50 in the cartridge 10 may be refilled, such that the cartridge 10 is reusable.

In at least one example embodiment, the reservoir 50 may optionally contain a storage medium (not shown). The storage medium may be configured to store the pre-vapor formulation therein. The storage medium 210 may include a winding of cotton gauze or other fibrous material.

In at least one example embodiment, the storage medium may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be sintered, porous, or foamed material. Also, the fibers may be sized to be irrespirable and may have a cross-section which has a Y-shape, cross shape, clover shape or any other suitable shape.

In at least one example embodiment, the housing assembly 20 includes a transverse end wall 55 at the first end 8 of the housing 19. The transverse end wall 55 includes the at least one outlet 65 (shown in FIG. 3) extending therethrough. The transverse end wall 55 is integrally formed with the housing 19.

In at least one example embodiment, the housing assembly 20 also includes a secondary transverse wall 60 between the transverse end wall 55 and the second end 7 of the housing 19. The secondary transverse wall 60 is also integrally formed with the housing 19. There are no outlets through the secondary transverse wall 60. Thus, the secondary transverse wall 60, along with the inner surface 22 of the housing 19 and the end cap assembly 15, define the reservoir 50 when the cartridge is assembled. The secondary transverse wall 60 is sized and configured to form part of the reservoir 50 and extends between opposing portions of the inner surface 22 of the housing 19.

In at least one example embodiment, the housing assembly 20 also includes at least one air passage 35 extending longitudinally through the housing between the outer surface 21 and the inner surface 22 of the housing 19. The at least one air passage 35 communicates with the outlets 65 (shown in FIG. 3). Accordingly, air and/or vapor flows into the cartridge 10 via the air passages 35 and exits via the outlets 65.

In at least one example embodiment, the cartridge 10 includes eight air passages 35 spaced substantially uniformly around the housing 19 of the housing assembly 20. The number of air passages 35 may be altered to adjust a resistance-to-draw (RTD) of the electronic vaping device 100 (shown in FIG. 1).

In at least one example embodiment, the cartridge 10 also includes the reservoir cap assembly 15 that is configured to be inserted in an opening 45 of the housing assembly 20.

In at least one example embodiment, as shown in FIG. 5, the reservoir cap assembly 15 compression fits and/or friction fits within the opening 45 of the housing assembly 20. The reservoir cap assembly 15 may be permanently glued in place within the opening 45 of the housing assembly 20. In another example embodiment, the reservoir cap assembly 15 may be removable from the opening 45 of the housing assembly 20 so as to facilitate refilling of the reservoir 50.

In at least one example embodiment, the wick 25 has a first end 27 that extends into the reservoir 50. The wick 25 also includes a second end 26 that protrudes from the opening 18 in the reservoir cap 17. In at least one example embodiment, the second end 26 protrudes from the opening 18 by about 2 mm to about 8 mm (e.g., about 3 mm to about 7 mm or about 4 mm to about 6 mm).

Figure 6:
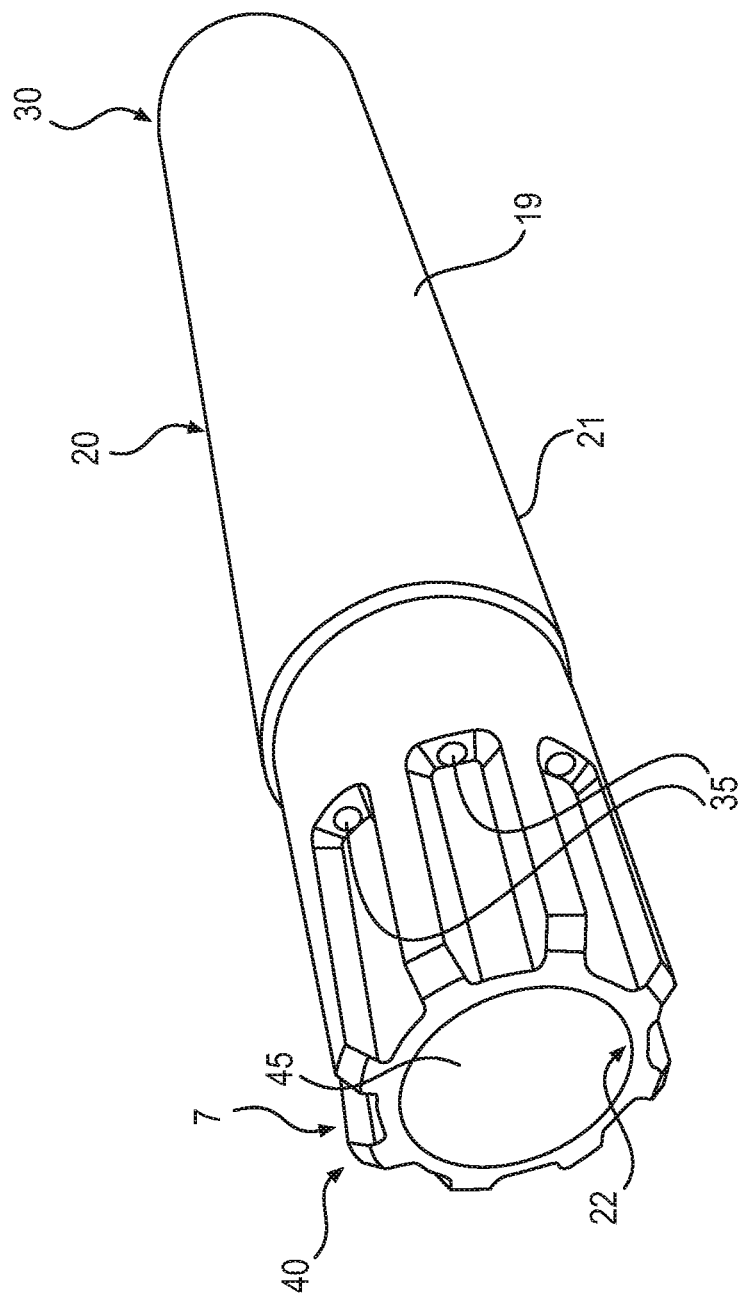
FIG. 6 is a perspective view of a housing of the cartridge of FIG. 4 according to at least one example embodiment.

FIG. 6 is a perspective view of a housing of the cartridge of FIG. 4 according to at least one example embodiment.

In at least one example embodiment, as shown in FIG. 6, the housing 19 is the same as in FIGS. 1-5, but is shown without the reservoir cap assembly 15 inserted in the opening 45 at the second end 7 of the housing 19.

Figure 7:
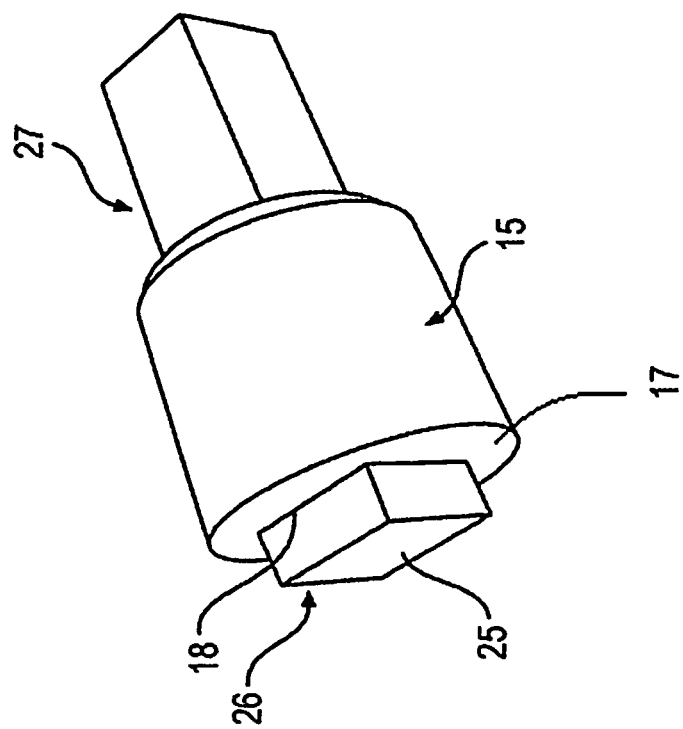
FIG. 7 is a perspective view of an end cap assembly according to at least one example embodiment.

FIG. 7 is a perspective view of a reservoir cap assembly according to at least one example embodiment.

In at least one example embodiment, as shown in FIG. 7, the reservoir cap assembly 15 is the same as the reservoir cap assembly 15 shown in FIG. 5, but is shown detached from the cartridge 10. In at least one example embodiment, the wick 25 is a monolithic wick.

Figure 8:
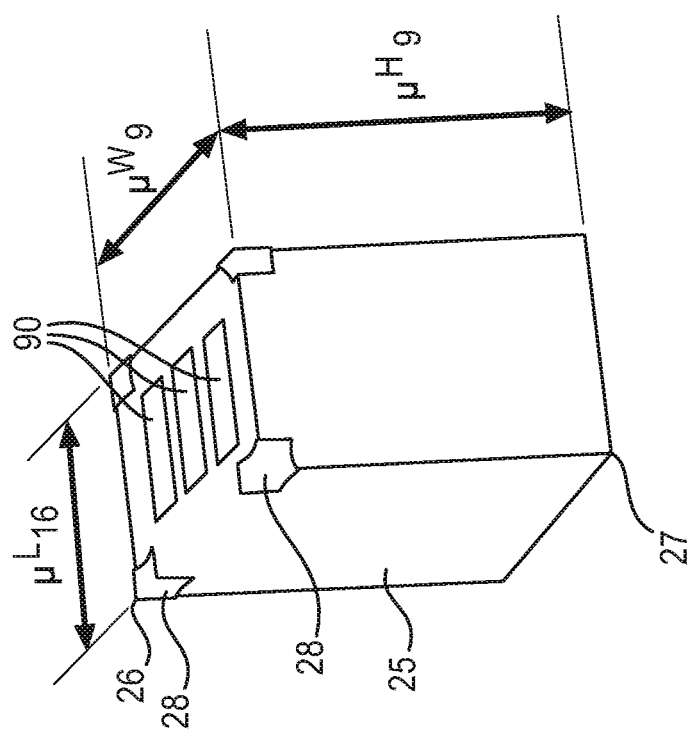
FIG. 8 is a perspective view of a wick according to at least one example embodiment.

FIG. 8 is a perspective view of a wick according to at least one example embodiment.

In at least one example embodiment, as shown in FIG. 8, the wick may be a monolithic wick that includes at least one slot 90 extending longitudinally through the wick 25.

In at least one example embodiment, the wick 25 may include at least two slots 90. The slots 90 may be evenly spaced through the wick 25. The slots 90 may have same or different dimensions.

In at least one example embodiment, the slot 90 is about 100 to about 400 microns wide (e.g., about 200 to about 300 microns wide).

In at least one example embodiment, the wick 25 may have a length ("L") of about 4 cm to about 6 cm, a width ("W") of about 4 cm to about 6 cm, and a height ("H") of about 5 mm to about 25 mm.

In at least one example embodiment, filter paper 28 may be applied to corners of the wick 25 at the second end 26. The filter paper 28 may minimize and/or reduce leakage from the reservoir 50 and/or around the wick 25. The filter paper 28 may be adhered to edges of the wick 25 and is positioned so as not to occlude the slots 90.

Figure 9:
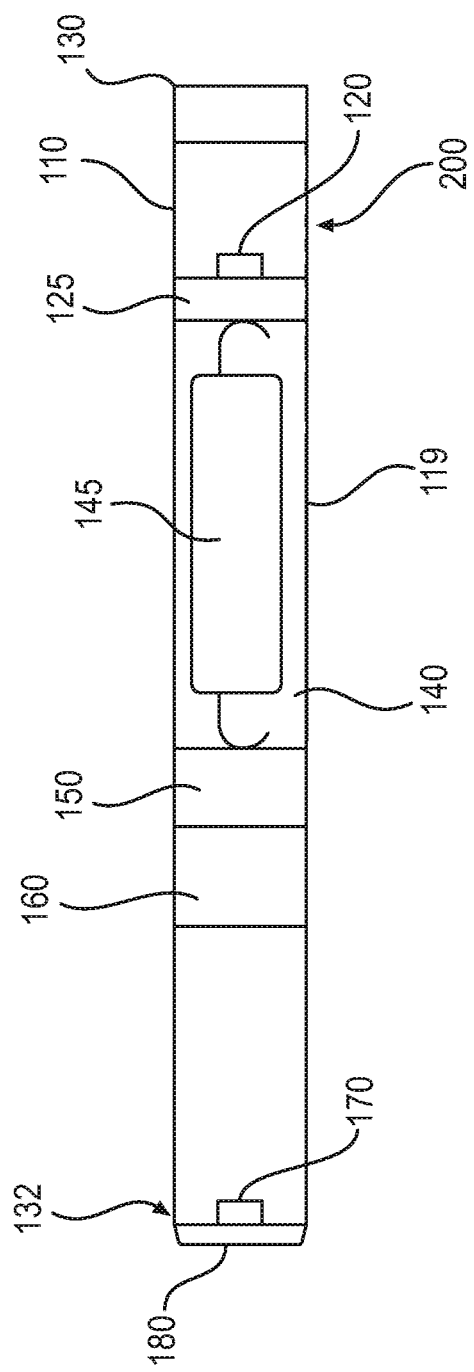
FIG. 9 is a cross-sectional view of the power supply section of FIG. 2 along line IX-IX according to at least one example embodiment.

FIG. 9 is a cross-sectional view of the power supply section of FIG. 2 along line IX-IX according to at least one example embodiment.

In at least one example embodiment, as shown in FIG. 9, the power supply section 110 includes a battery 145, a control circuit 150, a sensor, 160, a light 170, a heating element 120, and a heating element support 125 within the housing 119. An end cap 180 may be inserted in an opening at a second end 132 of the housing 119. An air inlet 200 may extend through a portion of the housing 119.

In at least one example embodiment, the battery 145 is electrically connected with the heating element 120. When air is drawn into the power supply section 110 via the air inlet 200, negative pressure may be sensed by the sensor 160. The control circuit 150 activates the heating element 120 in response to the sensed negative pressure.

In at least one example embodiment, the heating element 120 may include a wire coil which at least partially surrounds the wick 25 when the cartridge 10 is joined with the power supply section 110. The wire may be a metal wire and/or the heater coil may extend fully or partially along the length of the wick 25. The heater coil may further extend fully or partially around the circumference of the wick 25. In some example embodiments, the heater coil may or may not be in contact with the wick 25.

In at least one example embodiment, the heating element 120 is a planar heating element 120 that abuts the wick 25 when the electronic vaping device 100 is assembled.

In at least one example embodiment, the heating element 120 may be formed of any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heating element 120 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heating element 120 may include at least one material selected from the group consisting of stainless steel, copper, copper alloys, nickel-chromium alloys, super alloys and combinations thereof. In at least one example embodiment, the heating element 120 may be formed of nickel-chromium alloys or iron-chromium alloys. In another example embodiment, the heating element 120 may be a ceramic heating element having an electrically resistive layer, such as a layer of platinum, on an outside surface thereof.

In at least one example embodiment, the heating element 120 may heat pre-vapor formulation in the wick 25 by thermal conduction. Alternatively, heat from the heating element 120 may be conducted to the pre-vapor formulation by means of a heat conductive element or the heating element 120 may transfer heat to the incoming ambient air that is drawn through the electronic vaping device 100 during vaping, which in turn heats the pre-vapor formulation by convection.

In at least one example embodiment, the heating element support 125 holds the heating element 120 in position within the power supply section 110.

In at least one example embodiment, the battery 145 may be a Lithium-ion battery or one of its variants, for example a Lithium-ion polymer battery. Alternatively, the battery 145 may be a nickel-metal hydride battery, a nickel cadmium battery, a lithium-manganese battery, a lithium-cobalt battery or a fuel cell. The electronic vaping device 100 may be usable by an adult vaper until the energy in the battery 145 is depleted or in the case of lithium polymer battery, a minimum voltage cut-off level is achieved.

In at least one example embodiment, the battery 145 may be rechargeable and may include circuitry configured to allow the battery 145 to be chargeable by an external charging device. To recharge the electronic vaping device 100, an USB charger or other suitable charger assembly may be used.

In at least one example embodiment, the electronic vaping device 100 may include the sensor 160. The sensor 160 may be configured to sense an air pressure drop. The control circuit 150 initiates application of voltage from the battery 145 to the heating element 120. A light 170 may be activated by the control circuit 150 when the heating element 120 is activated. The light 170 may include a light-emitting diode (LED). Moreover, the light 170 may be arranged to be visible to an adult vaper during vaping. In addition, the light 170 may indicate that recharging is in progress. The light 170 may also be configured such that the adult vaper may activate and/or deactivate the light 170 for privacy.

In at least one example embodiment, the light 170 may be located on the second end 132 of the electronic vaping device 100. In other example embodiments, the light 170 may be located on a side portion of the housing 119.

When activated, the heating element 120 may heat a portion of the wick 25 for less than about 10 seconds or less than about 5 seconds. Thus, the power cycle may range in period from about 2 seconds to about 10 seconds (e.g., about 3 seconds to about 9 seconds, about 4 seconds to about 8 seconds or about 5 seconds to about 7 seconds).

In at least one example embodiment, the electronic vaping device 100 may be about 80 mm to about 110 mm long and about 7 mm to about 8 mm in diameter. For example, in one example embodiment, the electronic vaping device 100 may be about 84 mm long and may have a diameter of about 7.8 mm.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A cartridge of an electronic vaping device, the cartridge comprising:
a housing assembly including,
a housing extending in a longitudinal direction, the housing including,
an outer surface and an inner surface;
a reservoir configured to contain a pre-vapor formulation;
a transverse end wall at a first end of the housing, the transverse end wall having at least one outlet extending therethrough;
an opening in a second end of the housing;
a secondary transverse wall, the secondary transverse wall between the opening and the transverse end wall, the secondary transverse wall and the inner surface at least partially defining the reservoir; and
at least one air passage extending longitudinally through the housing between the outer surface and the inner surface thereof.

2. The cartridge of claim 1, further comprising:
a reservoir cap assembly configured to be inserted in the opening of the housing, the reservoir cap assembly defining an end of the reservoir.

3. The cartridge of claim 2, wherein the reservoir cap assembly comprises:
a reservoir cap having an opening extending there through; and
at least one wick extending through the opening in the reservoir cap.

4. The cartridge of claim 3, wherein the wick is a monolithic wick.

5. The cartridge of claim 3, wherein the wick includes one or more slots extending longitudinally through the wick.

6. The cartridge of claim 5, wherein the wick includes at least two slots.

7. The cartridge of claim 6, wherein the slots are about 100 microns to about 400 microns wide.

8. The cartridge of claim 5, wherein the slots are evenly spaced.

9. The cartridge of claim 5, wherein the slots have same dimensions.

10. The cartridge of claim 5, wherein the slots have different dimensions.

11. The cartridge of claim 4, wherein the wick has a height of about 6 cm, a width of about 3.5 mm and a length of about 3.5 mm.

12. The cartridge of claim 3, wherein the wick comprises a plurality of filaments.

13. The cartridge of claim 3, wherein the wick is formed from cellulose, glass, ceramic, graphite, a sub-combination thereof, or a combination thereof.

14. The cartridge of claim 3, wherein the wick has a first end extending into the reservoir and a second end extending from the opening in the reservoir cap.

15. The cartridge of claim 1, wherein the reservoir is configured to contain about 400 microliters to about 1000 microliters of the pre-vapor formulation.

16. The cartridge of claim 1, wherein the at least one air passage includes eight air passages spaced substantially uniformly around the housing.

17. An electronic vaping device comprising:
a cartridge including,
a housing assembly, the housing assembly including,
a housing extending in a longitudinal direction, the housing including,
an outer surface and an inner surface;
a reservoir configured to contain a pre-vapor formulation,
a transverse end wall at a first end of the housing, the transverse end wall having at least one outlet extending therethrough,
an opening in a second end of the housing,
a secondary transverse wall, the secondary transverse wall between the opening and the transverse end wall, the secondary transverse wall and the inner surface at least partially defining the reservoir; and at least one air passage extending longitudinally through the housing between the outer surface and the inner surface thereof; and a power supply section including,
a battery, and
a heating element electrically connected to the battery.

18. The electronic vaping device of claim 17, further comprising:

a reservoir cap assembly configured to be inserted in the opening of the housing assembly, the reservoir cap assembly defining an end of the reservoir.

19. The electronic vaping device of claim 18, wherein the reservoir cap assembly comprises:

a reservoir cap having an opening extending there through; and at least one wick extending through the opening in the reservoir cap.

20. The electronic vaping device of claim 19, wherein the wick is a monolithic wick.

21. The electronic vaping device of claim 19, wherein the wick includes one or more slots extending longitudinally through the wick.

22. The electronic vaping device of claim 21, wherein the wick includes at least two slots.

23. The electronic vaping device of claim 22, wherein the slots are about 100 microns to about 400 microns wide.

24. The electronic vaping device of claim 21, wherein the slots are evenly spaced.

25. The electronic vaping device of claim 21, wherein the slots have same dimensions.

26. The electronic vaping device of claim 21, wherein the slots have different dimensions.

27. The electronic vaping device of claim 17, wherein the at least one air passage includes eight air passages spaced substantially uniformly around the housing.

* * * * *